United States Patent [19]
Smith et al.

[11] Patent Number: 5,876,084
[45] Date of Patent: Mar. 2, 1999

[54] PANEL MOUNTING CLIP

[75] Inventors: Nels R. Smith, Holland; Joel L. Beezhold, Jenison; James D. Allardyce, Grandville; Michael P. Brierty; Jon L. Miller, both of Holland, all of Mich.

[73] Assignee: Prince Corporation, Holland, Mich.

[21] Appl. No.: 893,012

[22] Filed: Jul. 15, 1997

[51] Int. Cl.$^6$ ................................. B60R 13/02
[52] U.S. Cl. ...................... 296/39.1; 296/214; 24/297; 24/693; 52/511
[58] Field of Search ................... 296/39.1, 214; 24/297, 693; 52/511, 716.3–716.5

[56] References Cited

U.S. PATENT DOCUMENTS

| | | | |
|---|---|---|---|
| 1,912,416 | 6/1933 | Ausdol | 52/511 |
| 2,099,649 | 11/1937 | Hall | 296/214 |
| 2,199,347 | 4/1940 | Roethel . | |
| 2,227,761 | 1/1941 | Roethel . | |
| 2,598,776 | 6/1952 | Flora . | |
| 2,757,719 | 8/1956 | Duval | 52/716.4 |
| 2,876,971 | 3/1959 | Poupitch . | |
| 3,037,596 | 6/1962 | Fordyce . | |
| 3,889,320 | 6/1975 | Koscik | 24/297 |
| 3,953,067 | 4/1976 | Isola | 296/214 |
| 4,285,103 | 8/1981 | Inamoto | 411/508 |
| 4,505,611 | 3/1985 | Nagashima et al. | 403/406 |
| 4,568,215 | 2/1986 | Nelson | 24/693 |
| 4,841,706 | 6/1989 | Resan | 24/693 |
| 4,867,599 | 9/1989 | Sasajima | 24/297 X |
| 4,913,484 | 4/1990 | Dowd et al. | 296/97.12 |
| 5,011,218 | 4/1991 | Danner et al. | 296/214 |
| 5,056,199 | 10/1991 | Stein et al. | 24/297 |
| 5,104,272 | 4/1992 | Dupont et al. | 411/339 |
| 5,186,517 | 2/1993 | Gilmore et al. | 296/214 |
| 5,195,793 | 3/1993 | Maki | 24/297 X |
| 5,233,731 | 8/1993 | Phillips | 24/297 |
| 5,288,530 | 2/1994 | Maki | 428/31 |
| 5,419,606 | 5/1995 | Hull et al. | 296/146.7 |
| 5,507,610 | 4/1996 | Benedetti et al. | 411/339 |
| 5,636,891 | 6/1997 | Van Order et al. | 296/37.7 |

FOREIGN PATENT DOCUMENTS

| | | | |
|---|---|---|---|
| 3100270 | 8/1982 | Germany . | |
| 62-105741 | 5/1987 | Japan | 24/297 |
| 4208656 | 7/1992 | Japan . | |

*Primary Examiner*—Dennis H. Pedder
*Attorney, Agent, or Firm*—Price, Heneveld, Cooper, DeWitt & Litton

[57] ABSTRACT

A panel mounting assembly includes an elongated holder defining a track with a floor having inwardly projecting opposed facing flanges spaced above said floor for captively receiving legs of an inverted generally V-shaped clip. The track flanges include a plurality of opposed aligned slots for receiving flanges at the ends of the clip legs, thereby locking the clip in place along the track. The holder comprises a thermoplastic polymeric material having a plurality of projections which are melted to fuse the holder to the surface of the panel facing the underlying support structure. In another embodiment of the invention, a resilient polymeric mounting clip for a vehicle panel is made of a thermoplastic material having support panel engaging means extending therefrom in a first direction and a plurality of projections extending therefrom in an opposite direction for fusibly bonding the projections to a decorative panel.

12 Claims, 4 Drawing Sheets

PANEL MOUNTING CLIP

BACKGROUND OF THE INVENTION

The present invention relates to a vehicle panel mounting clip for attachment of a decorative panel for a vehicle to the underlying sheet metal support.

There exists a variety of fasteners for use in connection with the mounting of vehicle decorative panels, such as door panels, headliners and the like, to the underlying support members, typically sheet metal beams with apertures for receiving such fasteners. Fasteners have included Christmas tree-type fasteners attached to the decorative panel and including an outwardly projecting shank with a plurality of ribs which snap-fit within a circular aperture in the sheet metal support. Other fasteners have included polymeric members with arrowhead-shaped tips which deflect and snap-fit within apertures in the underlying supports. These fasteners frequently include pins for wedging legs of the fastener outwardly once inserted into the underlying sheet metal. Although such systems provide adequate fastening of a panel to underlying support structure, they do not provide the flexibility of adjustment of the panel with respect to mating apertures formed in the underlying support structure and in some instances can be relatively expensive and difficult to attach to the panel.

There exists, therefore, a need for a relatively inexpensive adjustable fastener which can be attached to a vehicle panel at selected locations and preferably coupled to the panel during assembly of the panel onto the underlying support structure where the final mating of the decorative panel to the vehicle support structure is achieved.

SUMMARY OF THE PRESENT INVENTION

The panel mounting clip of the present invention provides the flexibility of allowing the clip to be secured at selected locations directly on a vehicle panel or can be attached to a holder mounted to the vehicle panel at selectable locations during final assembly of the panel onto a vehicle substrate or subsequent attachment of the panel to the underlying support structure. In one preferred embodiment of the invention, the panel mounting clip comprises a two-piece assembly with an elongated holder defining a track with a floor having inwardly projecting opposed facing flanges spaced above said floor for captively receiving legs of an inverted generally V-shaped clip. The track flanges include a plurality of opposed aligned slots for receiving flanges integrally formed at the ends of the clip legs for locking the clip in place along the track. The clips can be slid to a variety of locations along the elongated track for mounting a vehicle panel to a particular mating aperture in the vehicle underlying support structure. In a preferred embodiment of the invention, the clip comprises a resilient polymeric material such as polypropylene, which is in the form of an inverted V-shape having an apex with outwardly and downwardly inclined legs, an inwardly projecting ledge on each of the legs. The legs terminate in outwardly projecting flanges. The clip flanges interlock with the slots formed in the holder and, when the clip is inserted through an aperture in the underlying support structure, the ledges, which are spaced from the holder a predetermined distance corresponding to the thickness of the underlying support metal, engage the surface of the support metal opposite that of the panel for holding the panel thereto.

In one embodiment of the invention, the apertures formed in the underlying support panel are elongated slots to allow some lineal adjustment of the clip to the vehicle support structure during assembly. In a preferred embodiment of the invention, the holder comprises a thermoplastic polymeric material having a plurality of projections which can be heated to a melting temperature and subsequently bonded to the surface of the panel facing the underlying support structure for fusing the holder to the panel.

In another embodiment of the invention, a resilient polymeric mounting clip for a vehicle panel is made of a thermoplastic material having support panel engaging means extending therefrom in a first direction and a plurality of projections extending therefrom in an opposite direction for fusibly bonding said projections to a polymeric decorative panel.

With the system of the present invention, therefore, an easy to assemble, selectively adjustable fastening system is provided for attachment of a panel to an underlying vehicle support structure and one which is relatively inexpensive and easy for the assembler to utilize during the manufacturing of a vehicle. These and other features, objects and advantages of the present invention will become apparent upon reading the following description thereof together with reference to the accompanying drawings.

DETAILED DESCRIPTION OF THE PREFERRED EMBODIMENTS

Figure 1:
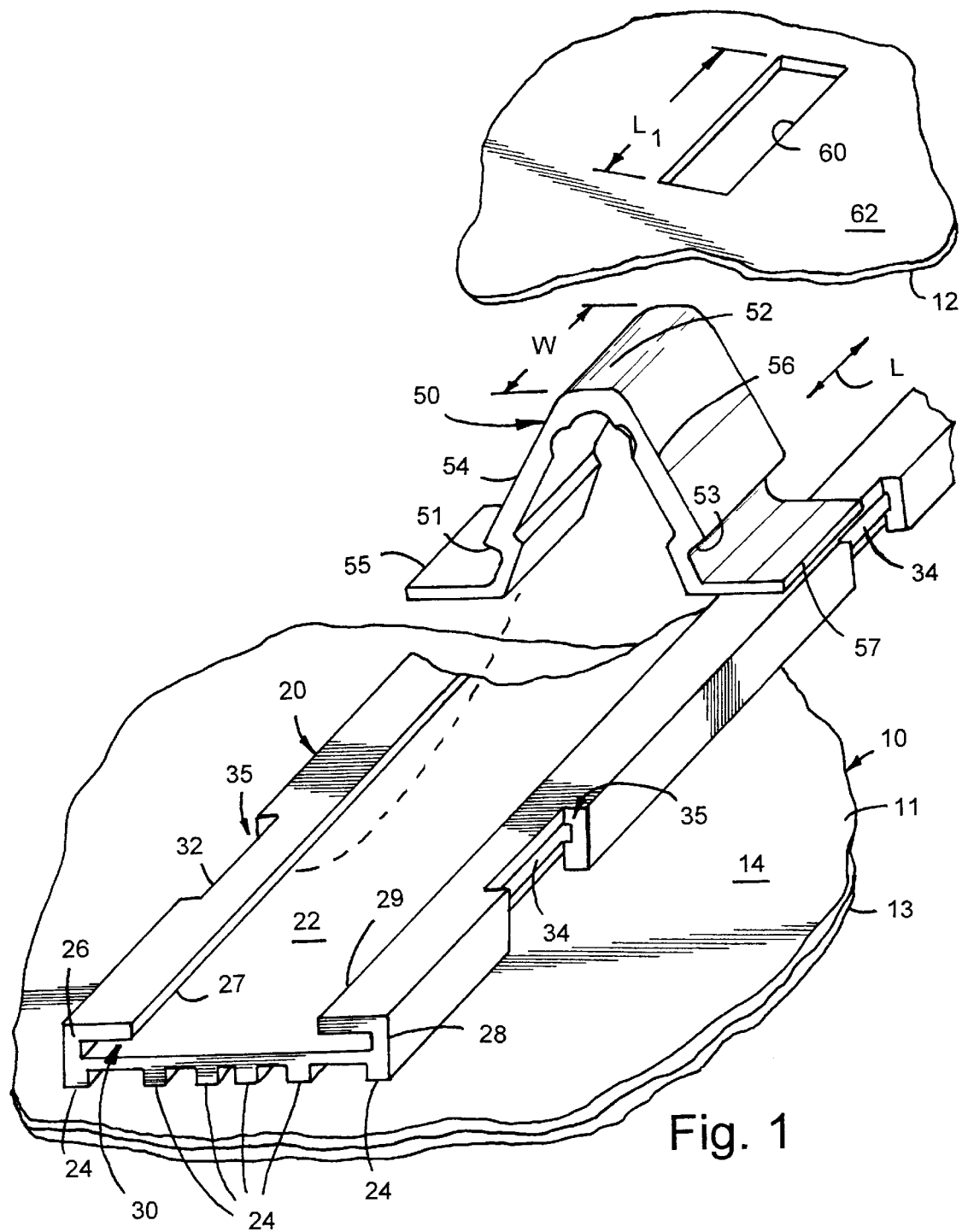
FIG. 1 is a fragmentary perspective exploded view of a panel mounting clip and holder of one embodiment of the present invention.

Referring initially to FIG. 1, there is shown a panel mounting assembly of the present invention for attaching a decorative panel 10 for a vehicle, such as an automobile, to an underlying support member 12. The panel 10 may comprise a headliner, door panel, seat back panel or other panels typically including a support backing 11 onto which there is bonded a decorative upholstery 13. The panel 10 may be of the type described in U.S. Pat. No. 4,828,910, which includes a resinous impregnated fibrous bat material for the backing 11 and a foam-backed upholstery for the decorative material 13. On the surface 14 of panel 10, there is mounted an elongated holder 20 defining a track for receiving, at any number of a plurality of spaced locations thereon, one or a plurality of mounting clips 50 which, once secured to holder 20, allow the snap-fitting of panel 10 to aperture(s) 60 in the sheet metal support 12 of the vehicle. Panel 10 in the preferred embodiment comprises a headliner with the sheet metal roof support 12 being a roof beam extended across the roof of the vehicle for providing rigidity to the sheet metal roof and mounting structure for the headliner.

Figure 3:
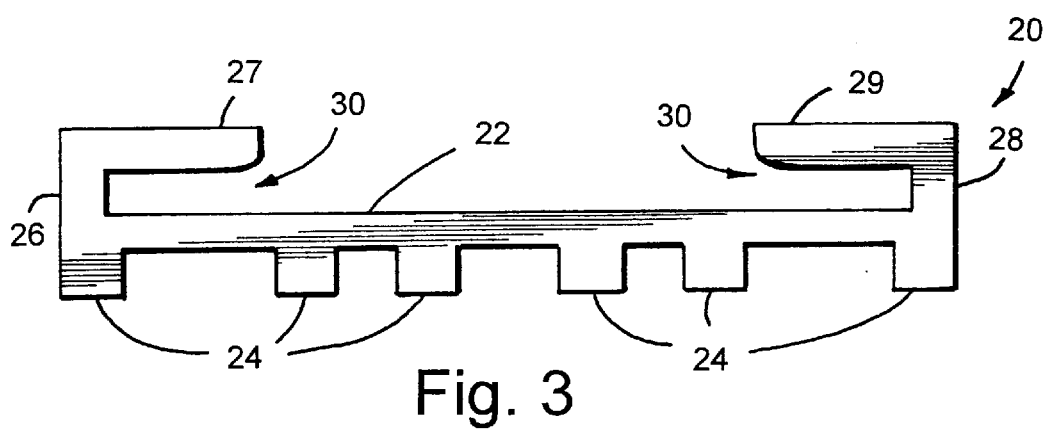
FIG. 3 is an enlarged end elevational view of the holder shown in FIG. 1.

The holder 20 of the preferred embodiment of the invention comprises an integrally molded thermoplastic (or partially cured thermosetting) member made of any suitable polymeric material such as polypropylene. As best seen in FIGS. 1 and 3, holder 20 includes a floor 22 having a plurality of downwardly extending, spaced parallel projections 24 in the form of ribs which can be melted either direct by a hot plate or radiation for fusing the downwardly depending ribs to the surface 14 of panel 10. Extending upwardly from the floor 22 of holder 20 are a pair of end walls 26 and 28 with inwardly projecting, opposed facing flanges 27 and 29, respectively, defining a slot 30 between the floor 22 and the flanges 27, 29, respectively, for receiving the clip 50. Clip 50, as described below, also interlocks within laterally extending slots 32 and 34 which are formed in the sides 26 and 28 at spaced locations along holder 20 and which lockably receive the clip 50. For such purpose, the sidewalls 26, 28 of holder 20 are vertically notched at spaced locations 35 to define the opposed aligned facing slots 32, 34, which are positioned at various locations along the longitudinal axis "L" of the track-type holder 20 as illustrated in FIG. 1.

Figure 2:
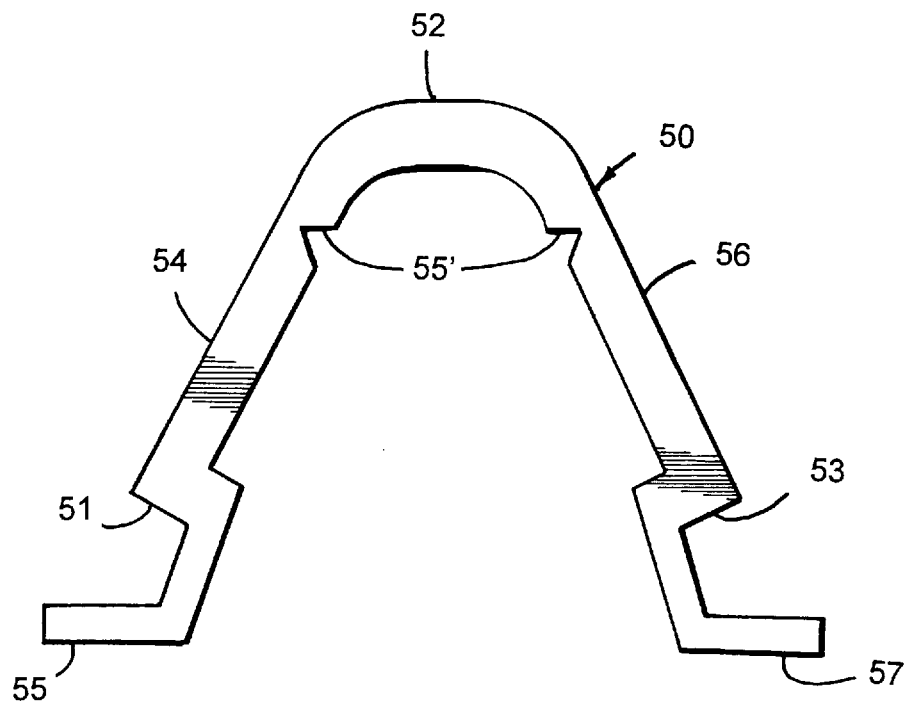
FIG. 2 is an enlarged end elevational view of the mounting clip shown in FIG. 1.

The mounting clip 50 comprises, as best seen in FIGS. 1 and 2, a generally inverted V-shaped member having an apex 52 with downwardly and outwardly projecting legs 54, 56. Clip 50, like holder 20, is made of a resilient polymeric material such as polyethylene, although it need not have the thermoplastic characteristics. Legs 54, 56 terminate in outwardly projecting opposed flanges 55, 57, which extend substantially horizontally and will, when compressed and released, snap-lock clip 50 into slots 32, 34 of holder 20 with clip flanges 55, 57 being positioned under holder flanges 27, 29, respectively, thereby vertically and horizontally locking clip 50 in place with respect to the holder at any one of a number of the spaced slot 34 locations in the holder. The clip 50, as best seen in FIG. 2, includes a pair of inclined, outwardly projecting ledges 51 and 53 formed in legs 54, 56, respectively, and spaced above flanges 55 and 57 a distance for engaging the upper surface 62 (FIG. 1) of support member 12 adjacent the edges of aperture 60. For such purpose, the ledges 51, 53 are inclined at an angle of approximately 30° from the horizontal to progressively engage and snap-lock the clip within aperture 60 when inserted therein. To add to the resiliency and deflectability of legs 54, 56, notches 55' can be formed in the inner surface of legs 54, 56 near apex 52 of the clip to facilitate the deflection of legs 54, 56 during the mounting of the clip to the holder as well as the subsequent deflection of the clip as the apex 52 is inserted through aperture 60 in the support member.

The holder 20 can be formed in a continuous track which extends the length of the panel 10 or can be short segments with but a pair of slots 32, 34. In a preferred embodiment, the holder includes several pairs of such slots to allow the clip 50 to be inserted therein as desired to mate with a corresponding aperture 60 in the roof of a vehicle where the same headliner may be employed with different vehicles having support beams located at different places along the roof. The advantage of such a system is that the clip 50 need not be mounted directly to the surface 14 of panel 10 prior to assembly and can, therefore, be finally positioned in general alignment with aperture 60 during final assembly of the panel 10 to underlying support 12. To facilitate alignment, aperture 60 may be elongated and have a length "$L_1$" which is greater than the width "W" of the clip 50 such that the clip, once locked into holder 20 and fixed in relationship to panel 10, can be moved longitudinally in the direction "L" in FIG. 1 for final positioning of the panel 10 with respect to the aperture 60. Typically, the direction L is in the fore and aft direction of the vehicle.

Figure 4:
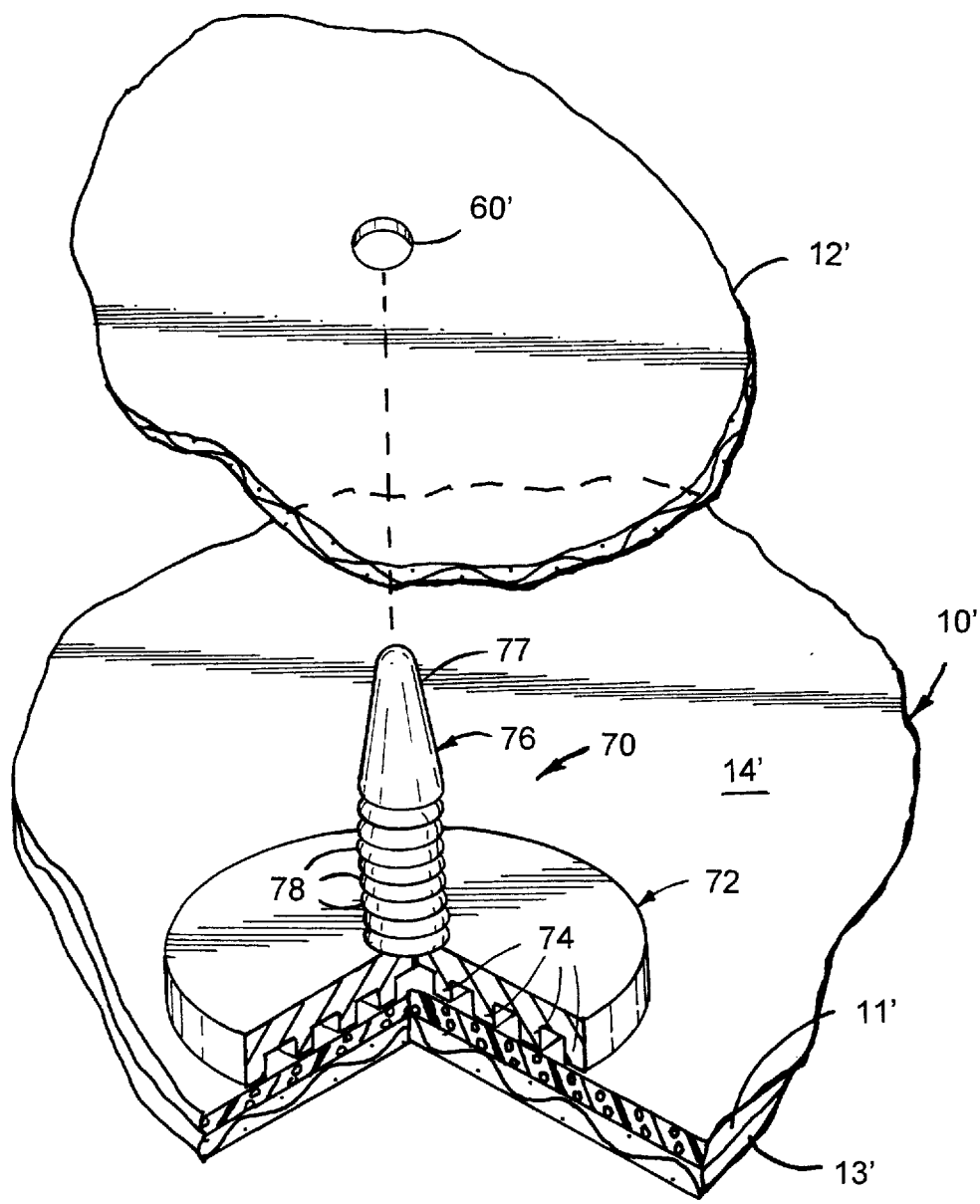
FIG. 4 is a fragmentary perspective exploded view, partly cutaway, of an alternative embodiment of the mounting clip of the present invention.

In another embodiment of the invention where the flexibility of adjustability of the fastening system is not as critical as, for example, where smaller panels are employed with substantially exact locations for holding assemblies, the embodiment shown in FIG. 4 may be employed. In the embodiment shown in FIG. 4, a fastener 70 is secured to the surface 14' of a decorative panel 10' of a vehicle having a support substrate 11' over which there is positioned a decorative upholstery material 13'. The fastener 70 comprises a substantially circular disk-shaped base 72 having a plurality of annular, downwardly extending concentric projections 74 which, like ribs 24 of holder 20, are fused by heat or radiation for bonding to surface 14' of panel 10'. Integrally molded and formed in the center of disk-shaped base 72 is an upwardly projecting post 76 having a conical tip 77 and a plurality of fluted concentric rings 78 which are deflectable and which snap-lock the fastener so defined into a circular aperture 60' formed in an underlying support 12' of the vehicle. The fastener 70 is also made of a suitable thermoplastic polymeric material such as polypropylene which allows the melting of the concentric ring projections 74 for their fusion onto surface 14'. It is understood that once fused, the shape of projections 74, as with ribs 24, become flattened as they engage and fuse to surface 14' of panel 10'.

Figure 5:
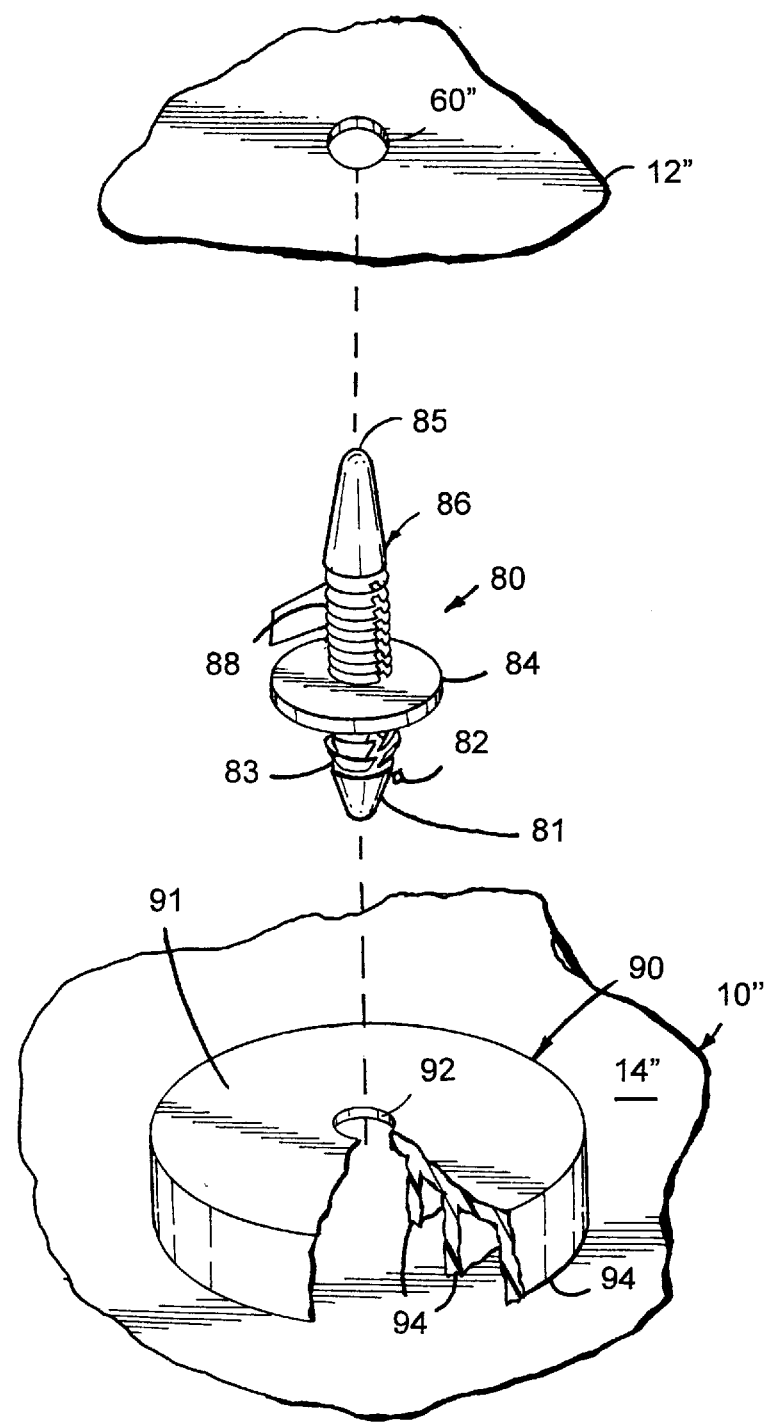
FIG. 5 is a fragmentary perspective exploded view, partly cutaway, of yet another embodiment of the mounting clip of the present invention.

In yet another embodiment of the invention as shown in FIG. 5, a fastener 80 is snap-locked into an aperture 92 in a holder in the form of a mounting cup 90, which has concentric mounting projections or rings 94, the tips of which are fused to the surface 14" of a panel 10". The cup-shaped support 90 includes a top surface 91 through which aperture 92 extends and receives a downwardly projecting post 82 of fastener 80 with post 82 having a conical tip 81 and a plurality of concentric fluted projections 83 extending outwardly from a central disk 84 extending in a plane transverse to the longitudinal axis of fastener 80. Extending upwardly from disk 84 is a second post 86 having a conical tip 85 for insertion into a circular aperture 60" of support member 12". A plurality of spaced concentric disk-like rings 88 extend along the side of post 86 such that as the rings are inserted in aperture 60" they selectively engage the edge of aperture 60", thereby holding the fastener 80 to the support member 12". During assembly, the fastener tip 81 will typically be first mounted within aperture 92 by extending conical end 81 of the fastener fully within the aperture 92 until the lower surface of disk 84 mates with the upper surface 91 of the mounting disk 90. The panel 10" is then aligned such that conical tip 85 of fastener 80 is aligned with aperture 60" and the panel 10" is then pushed upwardly toward support member 12" until the post 86 extends within aperture 60", thereby locking the fastener to the support member 12" and, therefore, the panel 10" to the underlying support 12'.

In each of the embodiments, a plurality of fusible projections or ribs are employed for bonding the polymeric holder or fastener to the underlying substrate of a decorative panel and resilient deformable fastening clips extend from a base or holder including such fusible members for insertion and locking into an aperture in the underlying support member.

It will become apparent to those skilled in the art that various modifications to the preferred embodiments of the invention as described herein can be made without departing from the spirit or scope of the invention as defined by the appended claims.

The invention claimed is:

1. A panel mounting clip assembly for mounting a panel to a vehicle substrate, said assembly comprising:

an elongated track-having a floor and inwardly projecting opposed facing track flanges spaced from said floor, said floor having a surface opposite said flanges with projections to be secured to a surface of a panel to be mounted to a vehicle, wherein said projections are a plurality of heat fusible spaced parallel ribs on said surface of said floor opposite said track flanges, wherein said track further includes a plurality of apertures formed through said track flanges; and at least one mounting clip including a pair of outwardly projecting clip flanges to extend through said apertures in said apertures in said track flanges to be captively received by said apertures in said track flanges for mounting said clip to said track.

2. The assembly as defined in claim 1 wherein said clip comprises an inverted substantially V-shaped member made of a resilient polymeric material.

3. The assembly as defined in claim 2 wherein said clip includes a pair of legs, each of which include an inclined ledge spaced from said clip flange a predetermined distance for engaging an aperture in a vehicle substrate.

4. A vehicle headliner assembly comprising:

a headliner including a surface facing a roof of a vehicle when installed in the vehicle;

an elongated track having a floor and inwardly protecting opposed facing track flanges spaced from said floor, said floor having a surface opposite said flanges with projections to be secured to said surface of said headliner, wherein said track further includes a plurality of apertures formed through said track flanges; and at least one mounting clip including a pair of outwardly projecting clip flanges to extend through said apertures in said track flanges to be captively received by said track flanges for mounting said clip to said track.

5. The assembly as defined in claim 4 wherein said clip comprises an inverted substantially V-shaped member made of a resilient polymeric material.

6. The assembly as defined in claim 5 wherein said clip includes a pair of legs, each of which include an inclined ledge spaced from said clip flange a predetermined distance for engaging an aperture in a vehicle substrate.

7. A panel mounting clip assembly for mounting a panel to a vehicle substrate, said assembly comprising:

a holder having a floor and inwardly projecting opposed facing flanges spaced from said floor, said floor having a surface opposite said flanges with projections to be secured to a surface of a panel to be mounted to a vehicle wherein said holder further includes a pair of apertures formed through said flanges in opposed aligned relationship; and a mounting clip including a pair of outwardly projecting clip flanges to be captively received in said apertures of said flanges for mounting said clip to said holder.

8. The assembly as defined in claim 7 wherein said projections are a plurality of heat fusible projections on said surface of said floor opposite said flanges.

9. The assembly as defined in claim 8 wherein said projections comprise spaced parallel ribs.

10. The assembly as defined in claim 8 wherein said clip comprises an inverted substantially V-shaped member made of a resilient polymeric material.

11. The assembly as defined in claim 10 wherein said clip includes a pair of legs, each of which include an inclined ledge spaced from said clip flange a predetermined distance.

12. A panel mounting clip assembly for mounting a panel to a vehicle substrate, said assembly comprising:

a holder having a floor and inwardly projecting opposed facing holder flanges spaced from said floor, said floor having a surface opposite said holder flanges with a plurality of heat fusible projections on said surface of said floor opposite said holder flanges to be secured to a surface of a panel to be mounted to a vehicle; and a mounting clip comprising an inverted substantially V-shaped member made of a resilient polymeric material, and including a pair of legs, each of which include a pair of outwardly projecting clip flanges to be captively received by said holder flanges for mounting said clip to said holder and an inclined ledge spaced from each of said clip flanges a predetermined distance for engaging an aperture in a vehicle substrate, wherein said holder further includes a pair of apertures formed through said holder flanges in opposed aligned relationship for allowing said clip flanges to extend through said apertures in said holder flanges.

* * * * *

UNITED STATES PATENT AND TRADEMARK OFFICE
CERTIFICATE OF CORRECTION

PATENT NO. : 5,876,084
DATED : March 2, 1999
INVENTORS : Nels R. Smith et al.

It is certified that error appears in the above-identified patent and that said Letters Patent is hereby corrected as shown below:

Column 4, line 50, "12'." should be --12"--.

Column 4, line 66, "track-having" should be --track having--.

Column 5, line 10, delete --in said apertures--.

Column 6, line 3, after "vehicle" insert --,--.

Signed and Sealed this

Twenty-sixth Day of October, 1999

*Attest:*

Q. TODD DICKINSON

*Attesting Officer*     Acting Commissioner of Patents and Trademarks